Patented Mar. 31, 1942

2,278,260

UNITED STATES PATENT OFFICE 2,278,260

DIOXAZINE DYESTUFFS

Heinrich Greune, Frankfort-on-the-Main, and Gerhard Langbein, Hofheim in Taunus, Germany, assignors to General Aniline & Film Corporation, a corporation of Delaware No Drawing. Application November 29, 1938, Serial No. 242,920. In Germany December 4, 1937

6 Claims. (Cl. 260—246)

The present invention relates to dioxazine dyestuffs.

We have found that dioxazine compounds prepared from 1.4-benzoquinones and two different arylamino compounds, constitute especially valuable new dyestuffs. The present invention comprises, for instance, dyestuffs of the following general formulae:

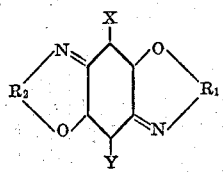

and

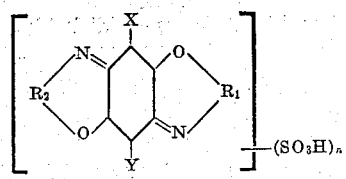

wherein X and Y represent members of the group consisting of hydrogen, halogen and methyl, $R_1$ and $R_2$ represent different aryl radicals and $n$ represents one of the numbers 1 to 8 inclusive.

The aryl radicals may be of various kind; they may contain in the nucleus any substituents, such as hydroxy, carboxy, the sulfo group, alkyl, amino, acylamino and the like.

Dyestuffs according to the present invention may be obtained by heating, preferably at a temperature above about 120° C., a 2.5-diarylamino-1.4-benzoquinone the aryl groups of which differ from one another, obtainable, for instance, by the process of (U. S. patent application Ser. No. 249,919, filed November 29, 1938, for "Diamino-1.4-benzoquinones and derivatives thereof and a process of preparing them" in the name of Gerhard Langbein), in an organic solvent of high boiling point and in the presence or absence of an organic or inorganic oxidizing agent, a metal chloride or an acylating agent, and sulfonating, if desired, the product thus obtained, whereby one or more, up to eight, sulfonic acid groups may enter the molecule.

Similar dyestuffs may also be made in a single operation by heating, for instance at a temperature above about 120° C., a 2-mono-arylamino-5-alkoxy-1.4-benzoquinone obtainable, for instance, by the process of (U. S. patent application Ser. No. 242,918, filed November 29, 1938 for "Amino-alkoxy-1.4-benzoquinones and derivatives thereof and a process of preparing them" in the name of Gerhard Langbein), with an amine, preferably in a high-boiling organic solvent, in the presence or absence of an acid-binding agent, an organic or inorganic oxidizing agent, a metal chloride or an acylating agent, and sulfonating, if desired, the product so obtained.

Similar dyestuffs are obtained by treating a 2.5-diarylamino-1.4-benzoquinone the aryl groups of which are different from one another, with concentrated sulfuric acid or with fuming sulfuric acid, if desired, with addition of an oxidizing agent.

The 2.5-diarylamino-1.4-benzoquinones used as parent materials may contain sulfonic acid groups; in this case, they may be prepared either from amino-aryl-sulfonic acids or by sulfonating 2.5-diaryl-amino-1.4-benzoquinones. There may further be used for the same reaction the 2.5-diaryl-1.4-benzoquinones of higher molecular weight, obtainable for instance by the process of Examples 13 and 14 (patent application Serial No. 242,919, filed November 29, 1938) of the above-cited U. S. patent. The corresponding dioxazine dyestuffs of higher molecular weight which have particularly valuable properties are, in this case, formed.

The new dioxazine dyestuffs obtained in accordance with the invention may be used in the form of pigment dyestuffs in the industry of lacquers, of tapestry, of paper, of rubber, and of plastics, or in the form of water-soluble sulfonic acids in the dyeing of animal, vegetable and artificial fiber or of mixed fabrics. The dyestuff sulfonic acids may also be used, in the form of their barium, calcium or other suitable salts, as pigments.

The parent materials may also contain groups which make the products useful as vat dyestuffs or as dyestuffs capable of forming complexes, such as, for instance, the salicyclic acid radical. In the latter case very valuable dyestuffs capable of being chromed are formed.

Owing to the variety of the substances which may be used as parent materials, the new process leads to dyestuffs, which constitute, especially with respect to their shades and fastness properties, a valuable enrichment of the dioxazine dyestuff class.

The following examples serve to illustrate the invention, but they are not intended to limit it thereto; the parts are by weight:

(1) A mixture of 10 parts of 2-(para-diphenyl)-amino-5-anilino-3.6-dichloro-1.4 - benzoquinone, 100 parts of nitrobenzene, 10 parts of 2.4-dinitro-phenol and 5 parts of para-toluene-sulfochloride is heated to boiling for 2 hours. After cooling, the solid product is filtered with suction and washed with nitrobenzene and alcohol.

The product which crystallizes in the form of needles having a green surface-luster is sulfonated by stirring it, at about 25° C., with fuming sulfuric acid of 20 per cent. strength. A sulfonic acid is obtained which dyes vegetable and artificial fibers clear red tints.

(2) 10 parts of 2-(N-ethyl-carbazolyl-3'-amino)-5-anilino-3.6-dibromo-1.4-benzoquinone and 150 parts of nitrobenzene are heated together to boiling for 2 hours. After cooling, the solid product is filtered with suction and washed with nitrobenzene and alcohol.

The product obtained in the form of needles having a green surface-luster is sulfonated, at 90° C., by means of sulfuric acid of 100 per cent. strength. A dyestuff is obtained which dyes animal, vegetable and artificial fibers red-violet tints of good properties of fastness.

(3) A mixture of 10 parts of 2-(beta-anthramino)-5-(para - diphenyl)-amino-3.6-dichloro-1.4-benzoquinone, 100 parts of trichlorobenzene and 5 parts of para-toluene-sulfochloride is heated to boiling for half an hour. After cooling, the product which crystallizes in the form of needles is filtered with suction and washed with nitrobenzene and alcohol.

Instead of trichlorobenzene, there may be used alphachloronaphthalene. By sulfonating the product by means of sulfuric acid of 100 per cent. strength, a dyestuff is obtained which dyes animal, vegetables and artificial fibers grey tints of good properties of fastness.

(4) A mixture of 10 parts of 2-(alpha-napthyl-amino)-5-anilino-1.4-benzoquinone (obtainable according to Suida Annalen 416, 120), 100 parts of nitrobenzene and 3 parts of meta-nitrobenzene-sulfo-chloride is heated to boiling for one hour. The product which crystallizes in the form of needles having a green surface-luster is filtered with suction and washed. By sulfonating it, a ruby-red sulfonic acid is obtained.

(5) A mixture of 10 parts of 2-(beta-naphthyl-amino)-5-(N-ethyl - carbazolyl-3'-amino)-3.6-dichloro-1.4-benzoquinone, 100 parts of ortho-dichlorobenzene and 4 parts of para-toluene-sulfo-chloride is heated to boiling for 2 hours. The solid product is filtered with suction, while hot, and washed with ortho-dichlorobenzene and alcohol. The product crystallizes in the form of needles having a green surface-luster and yields when sulfonated, a reddish-blue dyestuff.

(6) A mixture of 10 parts of (beta-naphthyl-amino)-anilino-chloro-toluquinone, 100 parts of nitrobenzene and 5 parts of ferric chloride is heated to boiling for one hour. The crystalline product is filtered with suction and washed with nitrobenzene and alcohol. By sulfonating it, a red-violet sulfonic acid is obtained.

(7) 10 parts of 2-(beta-anthraquinonylamino)-5-(para-diphenyl) - amino-3.6-dichloro-1.4-benzoquinone and 300 parts of sulfuric acid of 100 per cent. strength are heated together, for a short time, at 150° C. After cooling, the whole is poured on ice and the solid product obtained is filtered with suction and washed with a sodium chloride solution until neutral. The sulfonic acid thus obtained dyes vegetable and artificial fibers red-violet tints.

When using a sulfuric acid of a lower strength, a red-violet vat-dyestuff free from sulfonic acid groups is obtained.

(8) 10 parts of 2-(para-sulfo-anilino)-5-(para-diphenyl)-amino-3.6-dichloro-1.4 - benzoquinone and 300 parts of sulfuric acid of 100 per cent. strength are stirred together for 15 minutes, at a temperature of 150° C.–160° C. After cooling, the whole is poured on ice, and the solid product obtained is filtered with suction and washed with a sodium chloride solution until neutral.

The sulfonic acid thus obtained dyes animal, vegetable and artificial fibers red tints.

(9) 10 parts of 2-(4'-hydroxy-5'-carboxy-anilino)-5-(N-ethyl - carbazolyl - 3'- amino)-3.6-dichloro-1.4-benzoquinone are introduced, at 150° C., into 300 parts of sulfuric acid of 100 per cent. strength and the mixture is heated for 10 minutes at 170° C., while stirring. After cooling, the whole is poured on ice, and the solid product obtained is filtered with suction and washed with a sodium chloride solution until neutral. The dyestuff sulfonic acid thus obtained dyes chromed cotton navy-blue tints of good properties of fastness. A similar dyestuff is obtained if the parent material contains a sulfonic acid group in the salicylic acid radical.

(10) 10 parts of 2-(para'-amino-anilino)-5-(para-diphenyl)-amino-3.6-dichloro- 1.4 -benzoquinone and 300 parts of sulfuric acid of 100 per cent. strength are stirred together for 10 minutes at 190° C. After cooling, the whole is poured on ice, and the solid product obtained is filtered with suction and washed with a sodium chloride solution until neutral.

The dyestuff sulfonic acid obtained dyes vegetable and artificial fibers reddish-blue tints. It may be diazotized on the fiber and coupled with a naphthol, somewhat redder shades of improved fastness to washing being thus obtained.

(11) 10 parts of the product obtainable from 2 mols of 2-methoxy-5-(para-diphenyl)-amino-3.6-dichloro-1.4-benzoquinone and 1 mol of para-phenylene-diamine are stirred in 300 parts of fuming sulfuric acid of 20 per cent. strength, for 10 minutes at a temperature of 100° C. After cooling, the whole is poured on ice, and the solid product obtained is filtered with suction and washed with a sodium chloride solution until neutral. The dyestuff-sulfonic acid thus obtained has the following constitution:

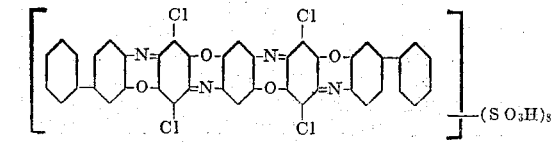

and dyes vegetable and artificial fibers intense clear, blue tints of good properties of fastness.

(12) A mixture of 10 parts of the product obtainable from 2 mols of 2-methoxy-5-(para-diphenyl) - amino-3.6-dichloro-1.4-benzoquinone and 1 mol benzidine, 300 parts of sulfuric acid of 100 per cent. strength and 2 parts of manganese dioxide is heated at 190° C.–200° C. for 15 minutes, while stirring. After cooling, the whole is poured on ice, and the solid product obtained is filtered with suction and washed with a sodium chloride solution until neutral. The dyestuff-sulfonic acid thus obtained dyes vegetable and artificial fibers grey-blue tints of good properties of fastness.

(13) A mixture of 34.8 parts of 2-methoxy-5-(beta - naphthylamino)-3.6-dichloro-1.4-benzoquinone, 21 parts of 3-amino-N-ethyl-carbazole and 500 parts of nitrobenzene is heated to boiling for 2 hours. After cooling, the whole is filtered with suction and the solid product obtained is washed with nitrobenzene and alcohol. The product which is obtained in the form of needles having a green surface-luster is identical with that prepared by Example 5.

(14) A mixture of 30.3 parts of 2-anilino-3.5.6-trichloro-1.4-benzoquinone (obtainable according to Niemeyer, "Annalen," vol. 228, page 337), 20 parts of beta-anthramine, 500 parts of nitrobenzene and 15 parts of para-toluene-sulfochloride is heated to boiling for 1 hour. After cooling, the product, which crystallizes in the form of needles having a reddish surface-luster is filtered with suction and washed. By sulfonating it by means of sulfuric acid of 100 per cent. strength, a grey sulfonic acid is obtained.

(15) A mixture of 45.7 parts of 2-butoxy-5-(N-ethyl-carbazolyl-3'- amino)- 3.6-dichloro-1.4-benzoquinone, 22 parts of 3-aminopyrene, 8.5 parts of sodium acetate, 500 parts of trichlorobenzene and 50 parts of alcohol is stirred for some time, at 90° C.–100° C. The alcohol and the glacial acetic acid formed are then eliminated by distilling at a raised temperature, 20 parts of meta-nitro-benzene-sulfo-chloride are then added and the whole is heated to boiling for one hour. The solid product is filtered with suction and washed with nitrobenzene and alcohol. The product crystallizes in the form of needles having a green surface-luster. When sulfonated in a feebly fuming sulfuric acid, it yields a dyestuff-sulfonic acid which has the following constitution:

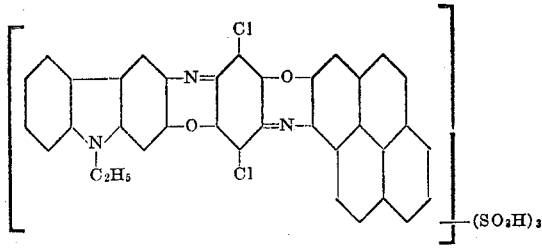

and dyes vegetable and artificial fibers clear, blue tints of good fastness properties.

(16) A mixture of 10 parts of 2-(N-ethyl-carbazolyl-3'-amino)-5 - (6''-hydroxy-7''-carboxy-naphthyl - 2'' - amino) - 3.6 -dichloro-1.4-benzoquinone, 150 parts of nitrobenzene and 6 parts of para-toluene-sulfo-chloride is heated to boiling for some minutes. It is then filtered with suction at 100° C. and the solid product obtained is washed with nitrobenzene and alcohol and dried.

The crystalline product is sulfonated by stirring it, at 20° C.–25° C., in fuming sulfuric acid of 5 per cent. strength. A sulfonic acid is obtained which has the following constitution:

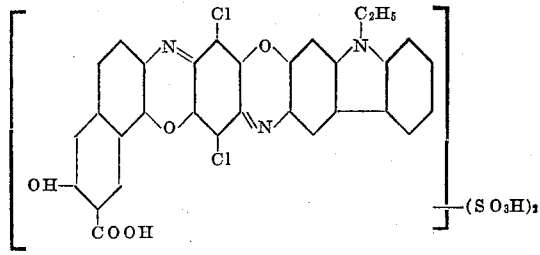

and dyes vegetable and artificial fibers clear, blue tints of very good fastness properties. By after-treating these dyeings with metal salts, their fastness to water and to washing is further improved.

Very fast dyeings are, likewise, obtained on fibers which have previously been chromed.

A similar, but reddish-blue dyestuff is obtained by treating in the same manner 2-(2'-naphthylamino) - 5-(6''-hydroxy- 7'' -carboxy-naphthyl-2''-amino)-3,6-dichloro-1.4-benzoquinone.

(17) 10 parts of 2-(pyrenyl-3'-amino)-5-(4''-hydroxy - 3''-carboxy-anilido)-3.6-dichloro-1.4-benzoquinone and 200 parts of fuming sulfuric acid of 20 per cent. strength are heated for a short time at a temperature of 120° C. After cooling, the mixture is poured on ice, filtered with suction and the solid product obtained is washed with a sodium chloride solution until neutral.

The sulfonic acid thus obtained dyes vegetable and artificial fibers bluish-grey tints. The fastness properties of these dyeings may be essentially improved by after-treating with a metal salt. Vivid, grey dyeings are also obtained on fibers which have previously be mordanted.

We claim:

1. The compounds of the group consisting of those of the general formulae:

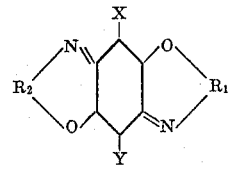

and

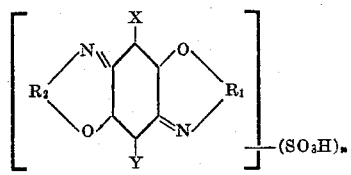

wherein X and Y represent members of the group consisting of hydrogen, halogen and methyl, R₁ and R₂ represent different aryl radicals and $n$ represents one of the numbers 1 to 8 inclusive.

2. The compounds of the general formula:

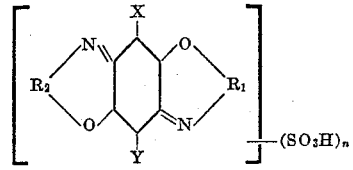

wherein X and Y represent members of the group consisting of hydrogen, halogen and methyl, R₁ and R₂ represent different aryl radicals and $n$ represents one of the numbers 1 to 8 inclusive.

3. The compounds of the general formula:

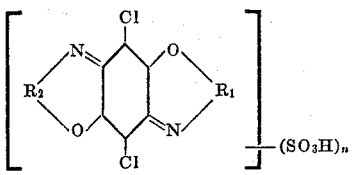

wherein R₁ and R₂ represent different aryl radicals and $n$ represents one of the numbers 1 to 8 inclusive.

4. The compound of the formula:

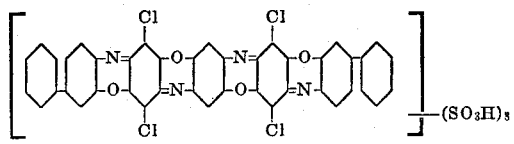

being a dyestuff-sulfonic acid which dyes vegetable and artificial fibers intense, clear, blue tints of good properties of fastness.

5. The compound of the formula:

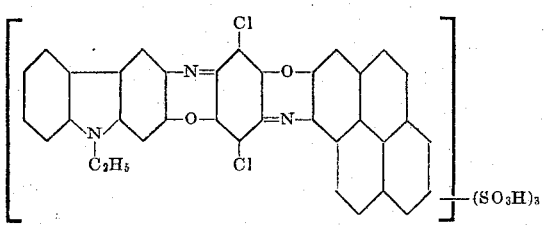

being a dyestuff sulfonic acid which dyes the vegetable and artificial fiber clear blue tints of good fastness properties.

6. The compound of the formula:

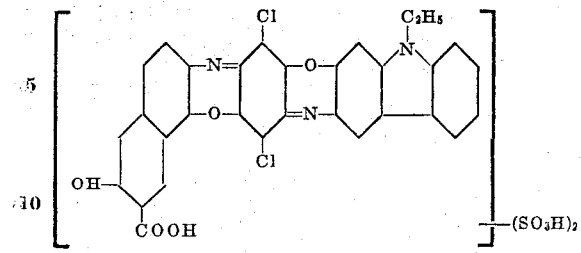

being a dyestuff sulfonic acid which dyes the vegetable and artificial fiber clear blue tints of very good fastness properties.

HEINRICH GREUNE.
GERHARD LANGBEIN.